US012712931B2

(12) United States Patent
Carluccio et al.

(10) Patent No.: US 12,712,931 B2
(45) Date of Patent: Aug. 18, 2026

(54) DISTRIBUTING VIDEO STREAMS TO DISPLAY SCREENS DURING A HYBRID CONFERENCE

(71) Applicant: Zoom Video Communications, Inc., San Jose, CA (US)

(72) Inventors: Andrew Kent Carluccio, San Francisco, CA (US); Jonathan Kokotajlo, Brooklyn, NY (US); Aayush Nirenkumar Shah, Longwood, FL (US); Karen Tan, Diamond Bar, CA (US); Adam Tow, Santa Clara, CA (US)

(73) Assignee: Zoom Communications, Inc., San Jose, CA (US)

( * ) Notice: Subject to any disclaimer, the term of this patent is extended or adjusted under 35 U.S.C. 154(b) by 191 days.

(21) Appl. No.: 18/428,478

(22) Filed: Jan. 31, 2024

(65) Prior Publication Data

US 2025/0247437 A1 Jul. 31, 2025

(51) Int. Cl.
*H04L 65/403* (2022.01)
*H04L 65/1069* (2022.01)
(Continued)

(52) U.S. Cl.
CPC ........ *H04L 65/403* (2013.01); *H04L 65/1069* (2013.01); *H04L 65/4015* (2013.01); *H04L 65/80* (2013.01)

(58) Field of Classification Search
CPC ............... H04L 65/403; H04L 65/1069; H04L 65/4015; H04L 65/80; H04L 65/401; H04N 7/147
See application file for complete search history.

(56) References Cited

U.S. PATENT DOCUMENTS 6,330,022 B1 * 12/2001 Seligmann ............. H04N 7/147 348/E7.083
7,564,476 B1 7/2009 Coughlan et al.
(Continued)

OTHER PUBLICATIONS

International Search Report and Written Opinion for PCT/US2024/060291 mailed Mar. 25, 2025.

*Primary Examiner* — Yosef K Laekemariam
(74) *Attorney, Agent, or Firm* — Kilpatrick Townsend & Stockton LLP

(57) ABSTRACT

One example method includes receiving, by a display management device, one or more display configuration selections for one or more corresponding video conference displays for a hybrid conference location, the hybrid conference location providing a real-world space associated with a corresponding virtual conference hosted by a virtual conference provider; accessing, by the display management device, the corresponding virtual conference via the virtual conference provider; requesting, by the display management device, a plurality of video streams of the virtual conference from the virtual conference provider, each video stream corresponding to a virtual participant, the display management device not corresponding to any virtual participant; generating, for each video conference display of the one or more video conference displays, a real-time video rendering of a respective subset of the plurality of video streams according to the one or more display configurations; and providing, to the one or more video conference displays, the respective real-time video rendering.

20 Claims, 9 Drawing Sheets

(51) Int. Cl.
*H04L 65/401* (2022.01)
*H04L 65/80* (2022.01)

(56) References Cited

U.S. PATENT DOCUMENTS

| | | | | |
|---|---|---|---|---|
| 8,482,593 | B2 * | 7/2013 | Periyannan | H04L 51/10<br>348/14.02 |
| 11,196,963 | B1 | 12/2021 | DiPasquale et al. | |
| 2012/0150956 | A1 * | 6/2012 | Tucker | G06Q 10/109<br>709/204 |
| 2023/0231974 | A1 | 7/2023 | Lee et al. | |
| 2023/0239432 | A1 * | 7/2023 | Deng | H04N 7/15<br>348/14.08 |

* cited by examiner

306

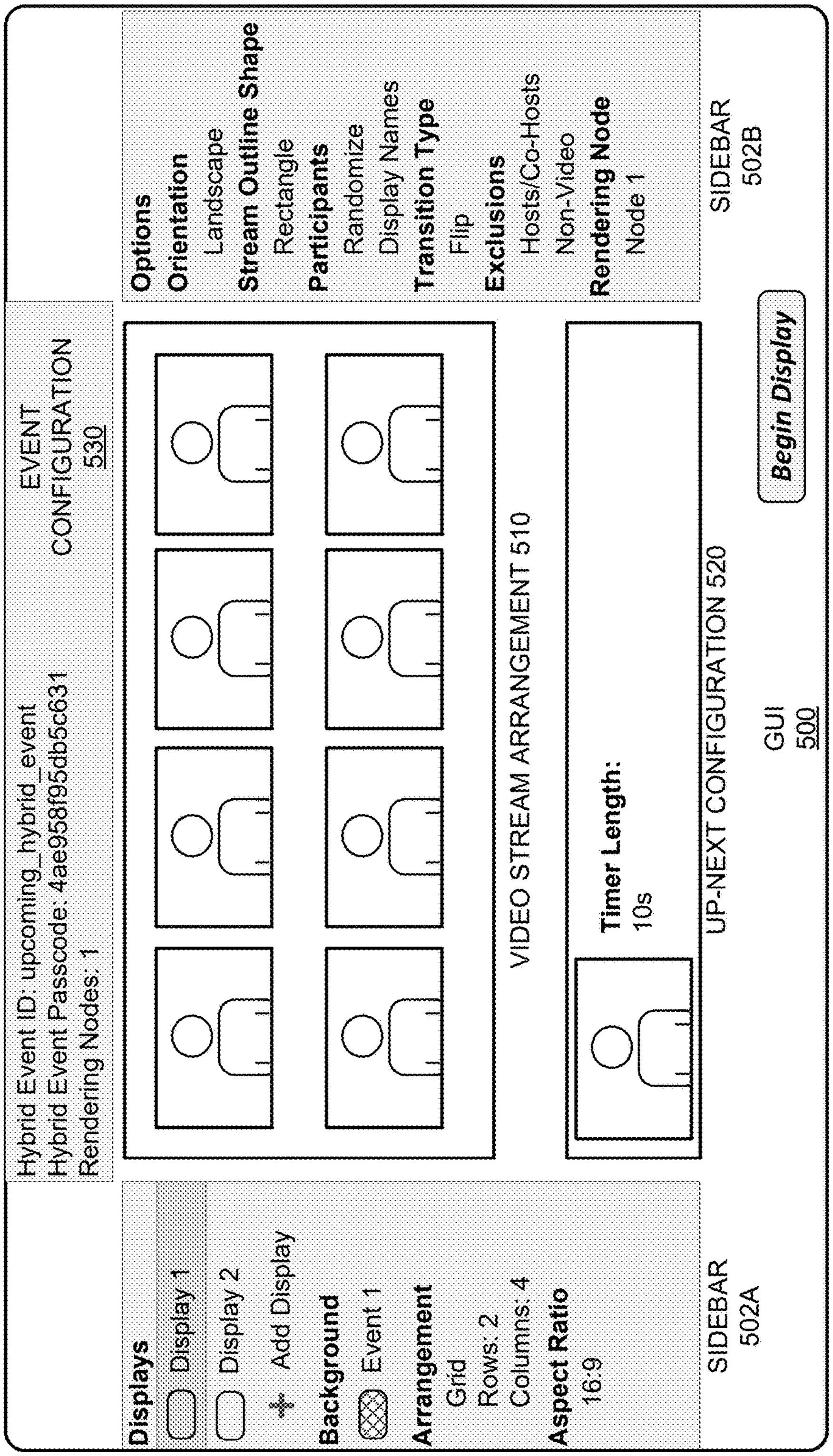

FIG. 5

Hybrid Event ID: upcoming_hybrid_event
Hybrid Event Passcode: 4ae958f95db5c631
Rendering Nodes: 1

EVENT CONFIGURATION 530

Displays
Display 1
Display 2
Add Display
Background
Event 1
Arrangement
Grid
Rows: 2
Columns: 4
Aspect Ratio
16:9

SIDEBAR 502A

VIDEO STREAM ARRANGEMENT 510

Timer Length:
10s

UP-NEXT CONFIGURATION 520

GUI 500

Begin Display

Options
Orientation
Landscape
Stream Outline Shape
Rectangle
Participants
Randomize
Display Names
Transition Type
Flip
Exclusions
Hosts/Co-Hosts
Non-Video
Rendering Node
Node 1

SIDEBAR 502B

DISTRIBUTING VIDEO STREAMS TO DISPLAY SCREENS DURING A HYBRID CONFERENCE

FIELD

The present application generally relates to virtual conferences, and more particularly relates to distributing video streams to display screens during a hybrid conference.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIGS. 5-6 show example graphical user interfaces for distributing video streams to display screens during a hybrid conference;

DETAILED DESCRIPTION

Figure 1:
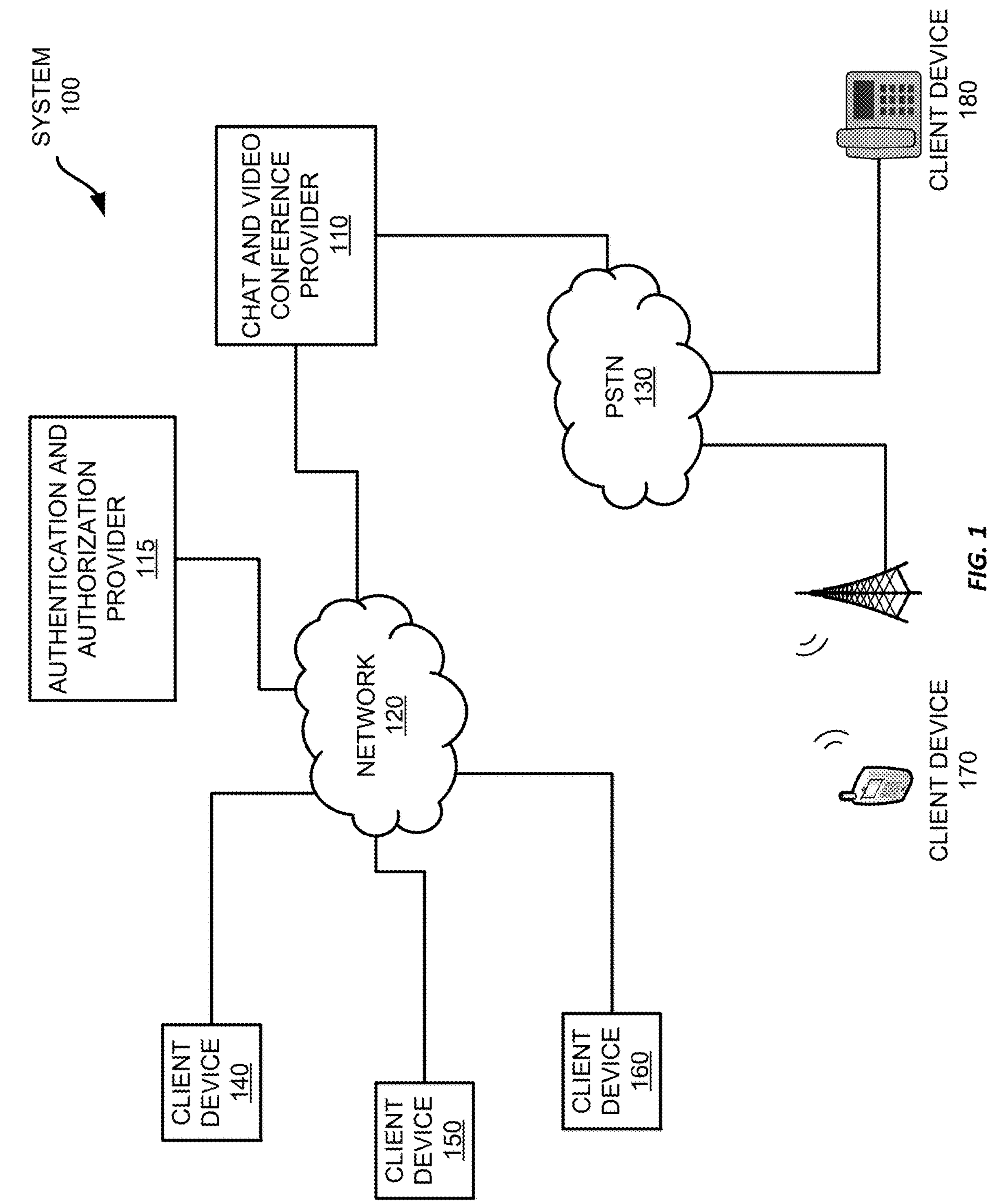
FIGS. 1 and 2 show example systems for distributing video streams to display screens during a hybrid conference.

Examples are described herein in the context of distributing video streams to display screens during a hybrid conference. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Virtual conferencing has become an increasingly common way for people to meet to discuss issues of interest and to provide presentations or webinars to large audiences scattered around the globe. In addition, virtual conferencing can enable people to attend a live event without physically attending. Instead, the real-world event space can be equipped with cameras and microphones to capture audio and video from the live event and provide it to a virtual conference provider, which can then allow others to join from remote locations to interact with the speakers or other individuals attending the event. However, from the perspective of the live attendees at the event, none of the remote attendees are visible and thus the live attendees may not be aware that the remote attendees are virtually present, and the remote attendees do not have any sense that they are engaged with the live attendees at the event.

To help provide a more inclusive experience, the real-world event space may provide one or more display devices that may positioned for easy viewing, such as on a stage, and video streams from the virtual attendees may be presented on those displays. A difficulty with such an approach, however, is aggregating the video feeds, selecting which video streams to display, allocating and arranging the video feeds on the various display devices, and dynamically changing the displayed video feeds during the live event.

A typical approach may be to join a client device at the live event space to the virtual conference as a remote participant, configure the GUI for the client software to display some of the remote participants, and then simply provide a view of the GUI on the display devices. However, this provides essentially no ability to control the appearance of the display because client software does not provide options to the users to select particular video streams to display or hide, such as users who are not providing a video stream, those who are distracted or disinterested, or are deliberately attempting to disrupt the event. In addition, the user cannot adjust the arrangement of the video streams within the GUI, since the client software itself only has fixed configurations for the display of other users within the GUI. Thus, for an event host, using such a technique is fraught with issues and presents an undesirable approach.

To provide an easy, dynamic way for an event organizer to provide a view of virtual attendees within the real-world event space, the event organizer can interact with client software that can pre-configure the appearance of user video streams on the display devices that will be available within the real-world conference space and configure artificial-intelligence ("AI")-based tools to automatically screen video streams for inclusion on the display devices. During the event, the event organizer can then dynamically view a representation of the display devices, the video streams presented on those display devices, as well as "up-next" video streams that will be periodically replace video streams already being presented on the display devices.

The client software, during the conference, will access the virtual conference provider to obtain information about the available video streams, determine bandwidth limitations and other network conditions to select candidate video streams, and request, queue, and render those video streams for inclusion on the display, once they have been determined to be suitable for inclusion. Thus, the event organizer can easily pre-configure the appearance of the display devices before the event begins and, once the event begins, they can populate the display devices with suitable video streams to provide a more immersive experience for the real-world attendees within the conference space.

By using such a system, a single person, or a small number of people, can manage a large number of virtual attendees and their inclusion on physical display devices within a real-world conference space. Moreover, the client software can assist the user(s) by using AI to pre-select or pre-screen available video streams based on the characteristics of those video streams, and provide a curated subset of video streams for display or to include within an "up-next" queue for later inclusion on the display devices.

This illustrative example is given to introduce the reader to the general subject matter discussed herein and the disclosure is not limited to this example. The following sections describe various additional non-limiting examples and examples of distributing video streams to display screens during a hybrid conference.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
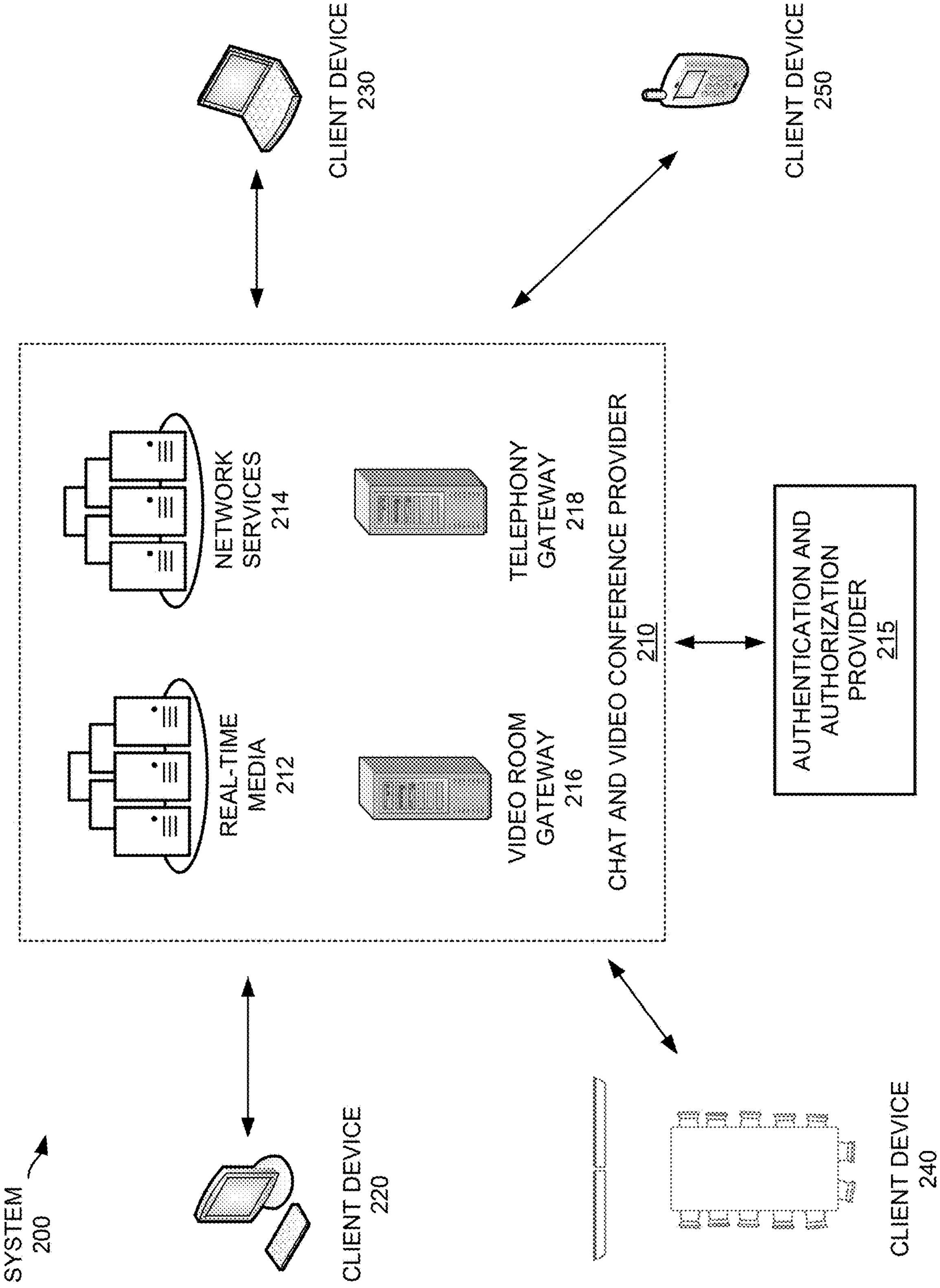

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
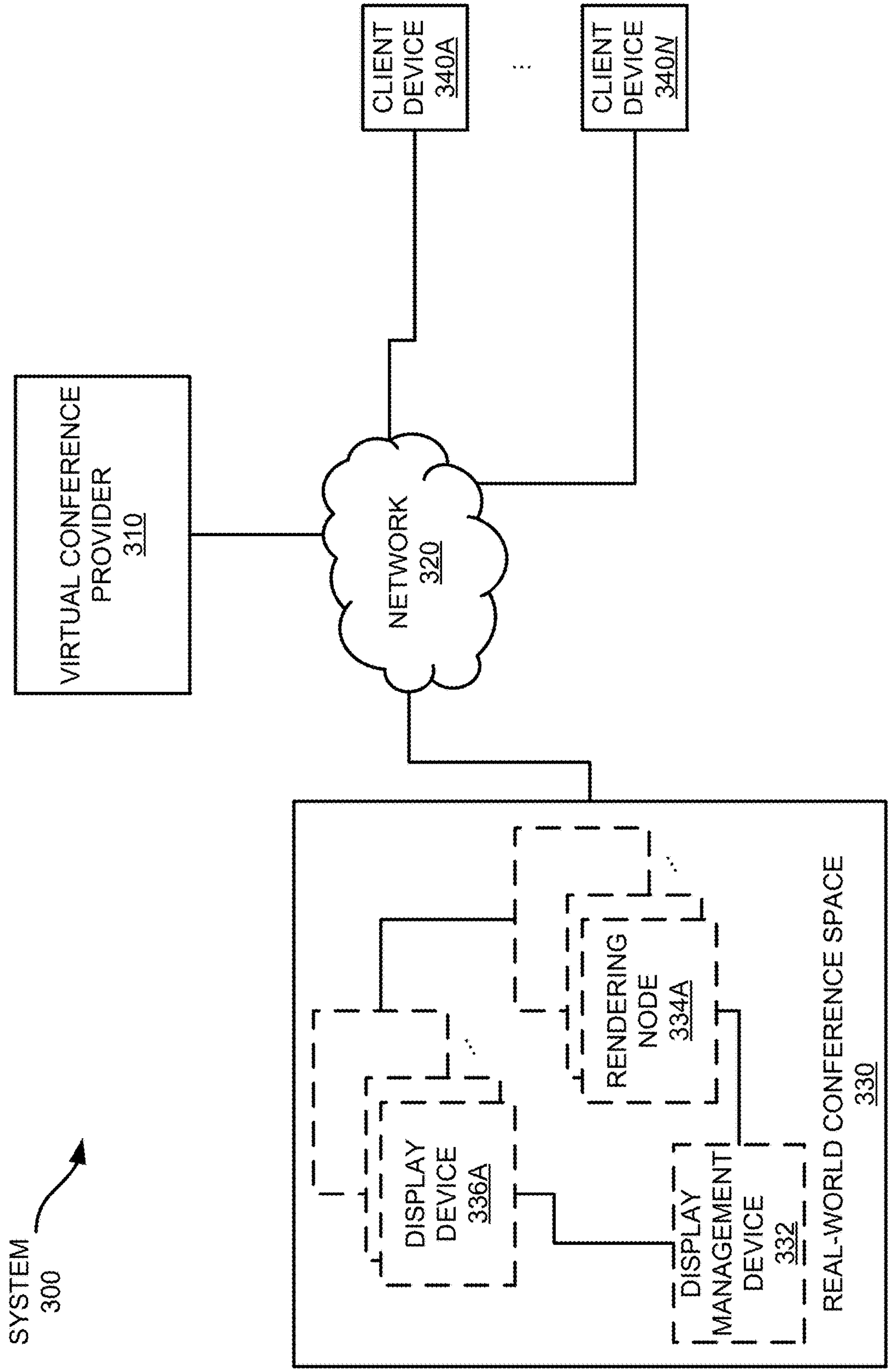
FIGS. 3A-3B and 4 show example systems for distributing video streams to display screens during a hybrid conference.
Figure 3B:
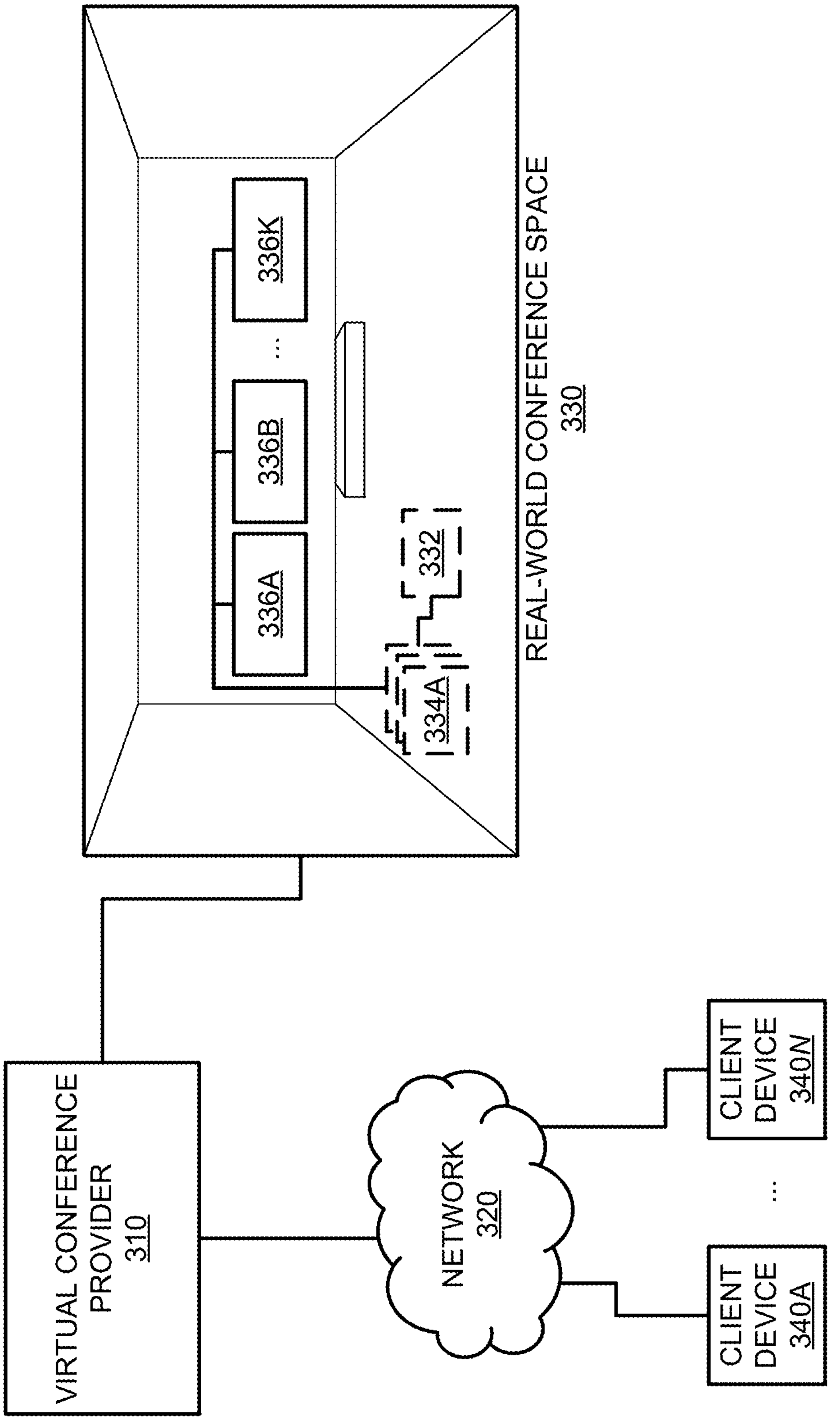

Referring now to FIGS. 3A-3B, FIG. 3A shows an example system for distributing video streams to display screens during a hybrid conference. Referring now to FIGS. 3A-3B, The system 300 includes a virtual conference provider 310, which can be connected to multiple client device 340*a-n* via one or more intervening communication networks 320. In addition, the virtual conference provider can be connected to a real-world conference space 330 that includes one or more computing devices 332-334, which will be discussed in more detail below. In this example, the communications network 320 is the internet, however, any suitable communications network or combination of communications network may be employed, including LANs (e.g., within a corporate private LAN), WANs, etc.

Each client device 340*a-n* executes virtual conference software that can be used to connect to the virtual conference provider 310 to participate in virtual conferences, engage in chat sessions, or take advantage of any other services offered by the virtual conference provider 310. In this example, the client devices 340*a-n* connect to the virtual conference provider 310 to join a hybrid conference hosted by an event organizer of a real-word event taking place at the real-world conference space 330. The term "real-world conference space" refers to a physical space where attendees can gather in-person to interact with each other. A real-world conference space may be any location in which people may physically gather to interact in-person, such as inside of a conference room or auditorium or in an outdoor space, or a combination of indoor and outdoor spaces.

During a hybrid conference, the various virtual participants (using virtual conference software or "client software" at their respective client devices 340*a-n*) are able to access and attend the hybrid conference, such as by viewing video feeds and hearing audio feeds from other participants, such as those presenting within the real-world conference space, and by capturing and transmitting video and audio of themselves. Client devices 340*a-n* may join virtual conferences hosted by the virtual conference provider 310 by connecting to the virtual conference provider and joining a desired virtual conference, generally as discussed above with respect to FIGS. 1-2. Once the participants have joined the conference, they may interact with each other by exchanging audio and video feeds.

The real-world conference space 330 includes one or more computing device 332, 334*a-m* that may be used to connect the real-world conference space 330 to the virtual conference provider 310 to provide a hybrid conference. In this example, the real-word conference space 330 includes a display management device 332 and multiple rendering nodes 334*a-m* as well as multiple display devices 336*a-k*. The display management device 332 and the rendering nodes 334*a-m* coordinate to generate and transmit display signals to the display devices 336*a-k* to present views of some or all of the virtual participants who are attending remotely via their client devices 340*a-n*.

Referring now to FIG. 3B, FIG. 3B shows another view of the system 300 shown in FIG. 3A. As can be seen in FIG. 3B, the real-world conference space 330 includes multiple display devices 336*a-k* that are positioned behind a presentation stage where one or more presenters may be located during the course of the hybrid conference. In-person attendees may then sit or stand in locations to view the presentation stage and the display devices 336*a-k*. In this example the display management device 332 and the rendering nodes 334*a-m* are displayed as being present in front of the presentation stage, but are positioned in an area not visible to the presenters and in-person attendees in some examples.

The display management device 332 executes client software that allows a user to establish display configurations for each display device and provide the display configurations to the rendering nodes 334*a-m*. In addition, the client software allows the user to monitor the status of the various display devices 336*a-k* during the hybrid conference and dynamically change the display configurations, determine which video streams to include or exclude from the displays, and provide instructions to the display nodes regarding which video streams to access and render for display.

The rendering nodes 334*a-m* receive display configurations from the display management device 332 and identifications of particular video streams to render for display. In some examples, the rendering nodes 334*a-m* may communicate with the virtual conference provider 310 to obtain the identified video streams, while in some examples, the rendering nodes 334*a-m* may receive the video streams from the display management device 332. The rendering nodes 334*a-m* then obtain the video streams, position and format them according to the display configuration, and render a display signal that is transmitted to a corresponding display device 336*a-k* to be displayed within the real-world conference space 330. It should be appreciated that while this example system 300 employs multiple rendering nodes, some examples may employ only one rendering node. Further, in some examples, the display management device 332 itself may operate as a rendering node 334. In some such examples, no other rendering nodes 334*a-m* may be used.

The display devices 336*a-k* may be any suitable display devices that can receive display signals from computer device and present a corresponding visual display. Such display devices may be conventional computer monitors or televisions, video projectors, or very large format displays, such as "display walls." While the example system employs three display devices 336*a-k* any suitable number of display devices 336*a-k* may be used in various examples.

Figure 4:
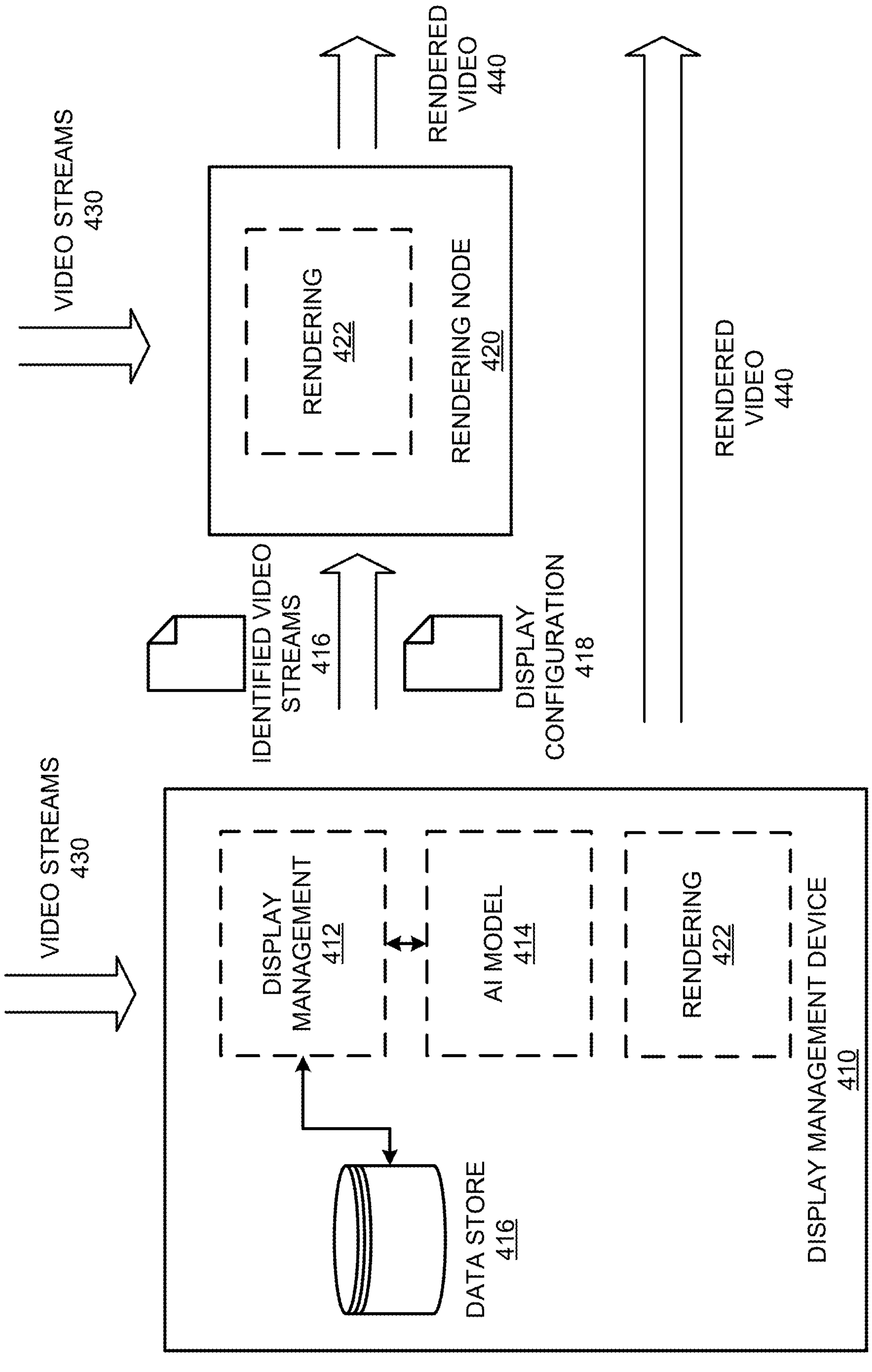

Referring now to FIG. 4, FIG. 4 shows an example system 400 for distributing video streams to display screens during a hybrid conference. In this example, the system 400 includes a display management device 410 and a rendering node 420. It should be appreciated that while only one rendering node 420 is shown in this example, any number of rendering nodes 420 (or none) may be used in some examples. The display management device 410 executes display management software 412 to allow a user to generate display configurations for one or more display devices for an upcoming hybrid conference. Thus, days or weeks before the hybrid event, a user may interact with the display management device 410 to establish display configurations.

Referring to FIG. 5, FIG. 5 illustrates an example graphical user interface 500 provided by the display management software 412 to enable a user to generate or change a display configuration for an event. As is shown in FIG. 5, the user has identified an upcoming event in the event configuration 530 portion of the GUI 500 and provided an identifier and passcode to enable the display management software 412 to connect to the event once it begins. In addition, the event configuration 530 specifies the number of rendering nodes that will be available. Information about the rendering nodes, such as network addresses and authentication information may be configured as well.

To configure the displays, the user is presented with options to add display devices to the display configuration in left sidebar 502*a*. In this example, the user has created a configuration that includes two displays. In the center of the GUI 500, the user is shown a representation of the video stream arrangement 510 for a selected display, Display 1 in this example. As a part of adding a display, the user may provide information about the display device such as its resolution and orientation, as well as a network address or other identification information that may be used to allow a computing device, such as the display management device 410 or a rendering node 420 to communicate with the display. The user may also select a background to use to fill in regions of the video stream arrangement that are not covered by video streams. After creating a display, the user can then select a display to configure according to a desired video stream arrangement.

As can be seen in the GUI 500, the user has created a video stream arrangement 510 where the video streams are positioned in a grid configuration with rows and columns for individual video streams to allow live video streams to be inserted into a corresponding position during the event. The right sidebar 502*b* provides options for the user to configure the video stream arrangement. In this example, the user has configured the arrangement for a landscape display orientation and has selected rectangular regions for the video streams. In this example, the user has established eight regions for video streams; however, any suitable number of video streams may be included on a particular display. Further, while the user has configured a grid arrangement for the video streams, any suitable arrangement may be used.

In addition to the specifics of the display itself and the positioning of video streams, the user can also configure the types of video streams to include, video streams to exclude, and how it should appear when a new video stream replaces an existing video stream. In this case, the user has opted to randomly select participant video streams from the available participants connected to the event and to also display the names of those participants.

In this example, the GUI 500 also provides the option for the user to assign a display to a rendering node, such as rendering node 420. In this example, rendering node 1 has been assigned to display 1.

In addition to the video stream arrangement 510, the user has also opted to periodically replace video streams displayed on the display with new video streams of different participants. Thus, the GUI 500 has provided an up-next configuration 520 that illustrates how an "up-next" queue will appear on the display management device and configuration settings for the queue. In this example, the queue will be displayed as a linear arrangement of video streams and every ten seconds, the next video stream from the up-next queue will replace one of the video streams already displayed on the display. Which video stream will be replaced may be determined accordingly to any suitable technique, such as randomly, based on which video stream has been displayed for the longest duration on the display, if a video stream on the display becomes undesirable (e.g., the user disables their video stream or disconnects from the event), or the user selects a video stream to be replaced. And while in this example, the user has selected a ten-second timer to elapse before the next video stream in the up-next queue replaces an existing video stream.

By interacting with the GUI to establish a display configuration that includes a video stream arrangement 510 and up-next configuration 520 in advance of a hybrid event, an event organizer can pre-configure the appearance of any display devices to display video streams of virtual participants attending the event. In contrast to existing systems that require a user manually capture and transmit screen capture video from a video conference application (or multiple instances of such an application) to transmit to a connected display device, the GUI can ensure the appearance of the virtual attendees is established and fully configured before the event.

At a later time, once the event has started, the user may again execute the display management software 412 and can select the "Begin Display" button to connect to the virtual conference corresponding to the event using the event information in the event configuration 530 portion of the GUI 500. In addition, the display management software 412 will attempt to connect to the specified rendering nodes. The user can then monitor the displays and the up-next queue. In some examples, the user can interact with the GUI 500 while the event is live to dynamically change the configuration of one or more displays. If the user makes changes, the updated display configuration 418 may be immediately transmitted to the corresponding rendering node, where it may immediately take effect.

Referring again to FIG. 4, after creating a display configuration 418, the display management software 412 stores it in the data store 416 for later use during the event.

When the hybrid event has begun, the display management device 410 executes the display management software 412 again. The user locates the saved display configuration 418 and connects to the virtual conference provider 310, such as by using the event information stored as a part of the display configuration 418 or by entering it into a GUI. The user also connects the display management software to the rendering node(s) 420, such as by selecting from dropdown list of available rendering nodes or providing a network address for a rendering node. After connecting to a rendering node 420, the display management software 412 provides the display configuration 418 to the rendering node 420. In some examples, the display management software 410 may provide information to the rendering node 420 that is needed to connect to the virtual conference provider 310. For example, the rendering node 420 may directly obtain one or more video streams 430 from the virtual conference provider 310. After receiving the display configuration 418, the rendering node 420 connects to the one or more displays assigned to the rendering node, such as by using the display information contained within the display configuration 418 as discussed above with respect to FIG. 5.

Once the display management software 412 and the rendering node(s) 420 have connected to each other and to their respective assigned displays, the display management software 412 can obtain and assign video streams to the available displays. While a rendering node 420 may render video to be displayed on a display device, the display management software 412 determines which video streams to allocate to which display. In this example, the display management software 412 transmits a request to the virtual conference provider for the available video streams associated with virtual attendees of the hybrid event. At the beginning of the event, the number of available video streams may be relatively small, however, as more virtual participants join, additional video streams may be made available to the display management software 412.

The display management software 412 receives one or more video streams from the available participants and identifies one or more video streams to be displayed on the available display devices. It then assigns video streams to the different display devices and transmits those assignments to the rendering node(s) 420, or if the display management device 410 itself is connected to a display device and is also operating as a rendering node, it may assign the video stream to itself. In this example, the display management software 412 does not provide the video streams to the rendering node(s) 420, but instead transmits identification information to enable the rendering node 420 to request the identified video streams 416 from the virtual conference provider. However, in some examples, the display management software 412 may request specific video streams and then forward the video to the rendering node 420.

Thus, as the event progresses and more video streams become available as users connect to the virtual conference provider 310, the display management software 412 receives information about additional video streams and assigns them to different displays. In this example, the display management software 412 also filters certain video feeds and does not assign them to any display. As discussed above with respect to FIG. 5, the user may establish one or more exclusions, which may include video streams that do not include video, e.g., they simply identify the user by name, or video streams for certain participants, e.g., the hosts or co-hosts of the hybrid event or other cameras located within the real-world conference space. Still other criteria may be used to identify video streams to include or exclude from being allocated to a video stream location within a video stream arrangement.

In some examples, the display management device 410 may dynamically select particular video streams to be included in a video stream arrangement based on criteria other than identifying particular users or a lack of video. For example, the event organizer may prefer to include remote participants that are particularly engaged with the hybrid event or to de-prioritize or block remote participants that are not engaged. For example, while a participant may not satisfy the exclusions discussed above, they may not be paying attention to the hybrid event and so their video stream may show them looking away from the camera or down at their smartphone. Alternatively, some people may be paying close attention to the hybrid event, may be looking at their camera, and may be visibly reacting to the content presented during the event. Further, some participants may simply have poor quality video streams: they may be in a poorly lit environment or their video may be distorted or low resolution due to network issues.

To help select high-quality video streams to include within a video stream arrangement 510, the display management software 412 may provide candidate video streams to a trained AI model to determine a level of user engagement. The trained AI model may evaluate the user to determine an engagement score, such as based on their gaze direction, their facial expression (e.g., smiling), whether a face is detected on screen, or whether the user is making a gesture or providing a reaction emoji (e.g., raising their hand). Based on the engagement score, the display management software may block a video stream from being queued for display or may remove a video stream from a display, or it may identify a video stream to be queued for display or to be "pinned" or be a "favorite" video stream that is not eligible for replacement.

In some examples, in addition to an AI model, the display management software 412 may analyze characteristics of the video stream, such as its resolution or overall brightness, or of a network connection to the participant providing the video stream, such as latency, jitter, or dropped frames. For video streams whose resolution or average brightness is below a corresponding threshold, the display management software 412 may exclude them from being included on a display, at least temporarily. Similarly, for participants whose network characteristics do not satisfy one or more thresholds, their corresponding video streams may be blocked until their network characteristics improve.

In some examples, the display management device 410 may also monitor network and processor utilization on the display management device and the rendering nodes. As more video streams are selected for inclusion, network and processor utilization increases: more network bandwidth is required to stream additional videos, while more processor resources are needed to decode the video streams and generate the rendered video 440. Thus, additional candidate video streams may be analyzed for their resolution or bandwidth requirements and may be blocked if sufficient resources are not available to handle a high-resolution video stream, or a lower-resolution version of the video stream may be requested instead. Alternatively, if network or processor utilization increases beyond a threshold, the display management device may dynamically alter a video stream configuration to reduce the number of video streams displayed. For example, if network utilization satisfied a threshold, the display management device may transmit an instruction to the rendering node 420 to eliminate the fourth column of video streams from its display and then re-size and relocate the remaining video stream locations according to a 2-row and 3-column grid. Thus, the display management software 412 can dynamically select or exclude particular video streams for display and dynamically adjust the appearance of the video stream arrangement during the event.

It should also be appreciated that in some examples, while the display management device 410 and the rendering node(s) 420 connect to the virtual conference, they do not connect as participants, but instead only connect as management or routing devices to obtain and route video streams to an endpoint, e.g., a display device. However, in some examples, either (or both) of the display management device 410 or the rendering node(s) 420 may connect to the virtual conference as participants and may also be identified as being excluded video streams.

When a rendering node receives identified video streams 416, whether as identifiers of video streams to obtain from the virtual conference provider or as actual video streams relayed by the display management device 410, it employs rendering software 422, which assigns the video streams to one of the available video stream locations in the video stream arrangement 510 for a particular display device. It may assign a video stream randomly to a display device and to a video stream location, or it may do so in sequential order to the next available video stream location. Still other allocation schemes may be employed. Once the video stream is assigned to a video stream location, the rendering node 420 generates video for a particular display device by optionally obtaining a background, such as may be provided by the display configuration as discussed above with respect to FIG. 5, resizing the one or more video streams to sizes for the corresponding video stream locations, and rendering the background and resized video streams into rendered video 440. The rendered video 440 is then output to the corresponding display device. The rendering node 420 then continues to iteratively generate video frames. As new video streams are substituted onto a display, a configured animation may be generated and rendered to highlight the transition. In this case, the configuration shown in FIG. 5 specifics a "flip" animation—the existing video stream will be animated to spin in place and the new video stream will replace the existing video stream mid-spin. Other types of animations may be used as well, such as fade-out/fade-in or dissolves. In some examples, no animations may be used and the example video stream may be replaced in by the new video stream.

In this example, the rendering node 420 is pre-configured to generate video frames at a particular frame rate, e.g., 24 frames per second, though any suitable frame rate may be employed. And while this description with respect to a dedicated rendering node 420, in some examples, the display management device 410 itself may operate as a rendering node by executing rendering software 422. Thus, the discussion of the rendering node 420 is equally applicable to a display management device 410 that is providing rendered video 440 to one or more display devices.

While the event is on-going, a user of the display management device 410 may interact with the display management software 412 to ensure that displays are managed appropriately. Thus, while the display management software 412 can autonomously manage video streams and rendering nodes, the user may still wish to perform certain configuration or moderation activities.

Figure 6:
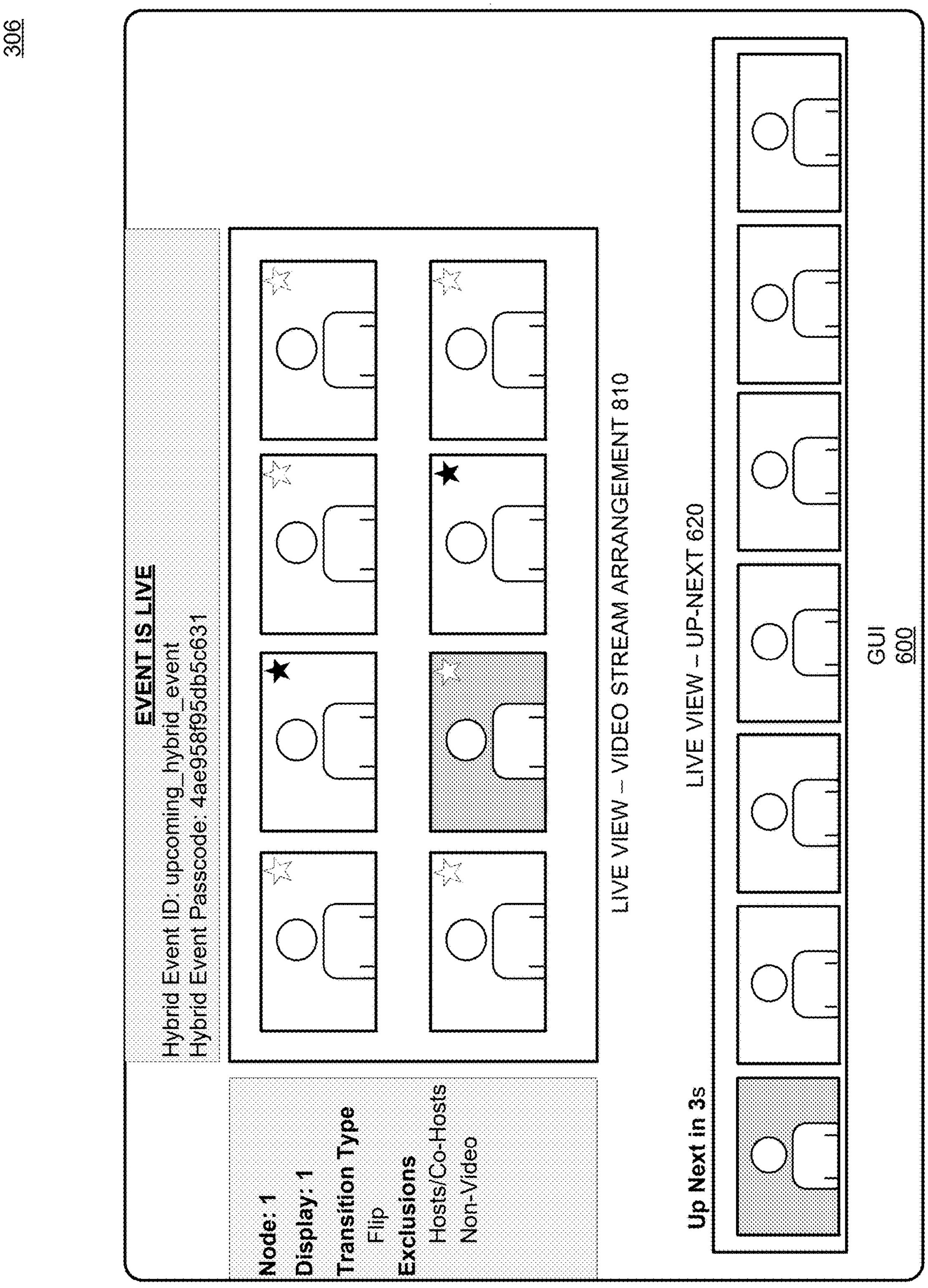

Referring now to FIG. 6, FIG. 6 shows another GUI 600 provided by the virtual management software 412. In this example, GUI 600 presents a moderation GUI for a live view of a video stream arrangement for a selected node and display device. In this example, the user has selected node 1 and display device 1. The user can also see live views of the video streams presented on display 1. In addition to showing the video streams, the user is also presented with the option of "pinning" or "favoriting" individual video feeds by selecting the star icon within a particular video feed. In this example, two video feeds have been favorited, meaning that they will not be replaced by another video stream until they are unfavorited. As discussed above, in some examples, the display management software 412 may autonomously favorite individual video streams, such as based on output from a trained AI model.

In addition to viewing the video streams being presented on the selected display, the user can also view the video streams that are queued to replace existing video feeds in the live view of the up-next queue 620. In this example, the up-next queue 620 shows the next seven video streams that will be used to replace existing video streams. The left-most video stream in the up-next queue 620 represents the next video stream that will be moved onto the display, which has been highlighted, and the time remaining until the replacement is shown above the queue (three seconds remaining in this case). In addition, the video stream to be replaced in the video stream arrangement is highlighted. Once the video stream has been replaced, then up-next queue 620 will shift the video streams in the queue to the left and add a new video stream to the queue.

While a video stream is in the up-next queue 620, the user can interact with the queue to pre-emptively remove a video stream from the queue or by entirely blocking a particular video stream. In addition, the user can select a video stream and drag it to a different position within the queue, such as if they would like a particular video stream to be queued up as the next video stream to be substituted onto the display. Similarly, the user may also interact with video streams being displayed on the display, such as to force an immediate substitution or to block a particular video stream. Thus, the user is able to view the status of the various displays and moderate the displays as needed.

Advantages of the example system and software discussed above with respect to FIGS. 4-6 allow access to individual videos streams that can be analyzed, grouped, and displayed in any desired combination and configuration. Existing solutions do not enable access to the individual video streams that may be collectively displayed within a GUI. Thus, a user of an existing system has limited ability to curate a public display of the participants within a meeting, whether entirely virtual or hybrid. Instead, they are confined to broadcasting the particular video streams that a particular GUI selects for display. The present system instead directly communicates with the virtual conference provider and obtains individual video streams. It can then analyze each individual video stream for suitability for inclusion within a public display of multiple virtual participants and dynamically adjust the display to ensure that the best available video streams are included. Further, because the configuration for an event can be created well before the event begins, the configuration can be loaded at the event and left to run itself, if no moderators are available to monitor the various displays. In some examples, as discussed above, as network or processor utilization satisfies particular thresholds, the display management software 412 can dynamically adjust the configuration of one or more display devices to reduce the load on the network or to reduce the processor utilization on a corresponding rendering node.

Figure 7:
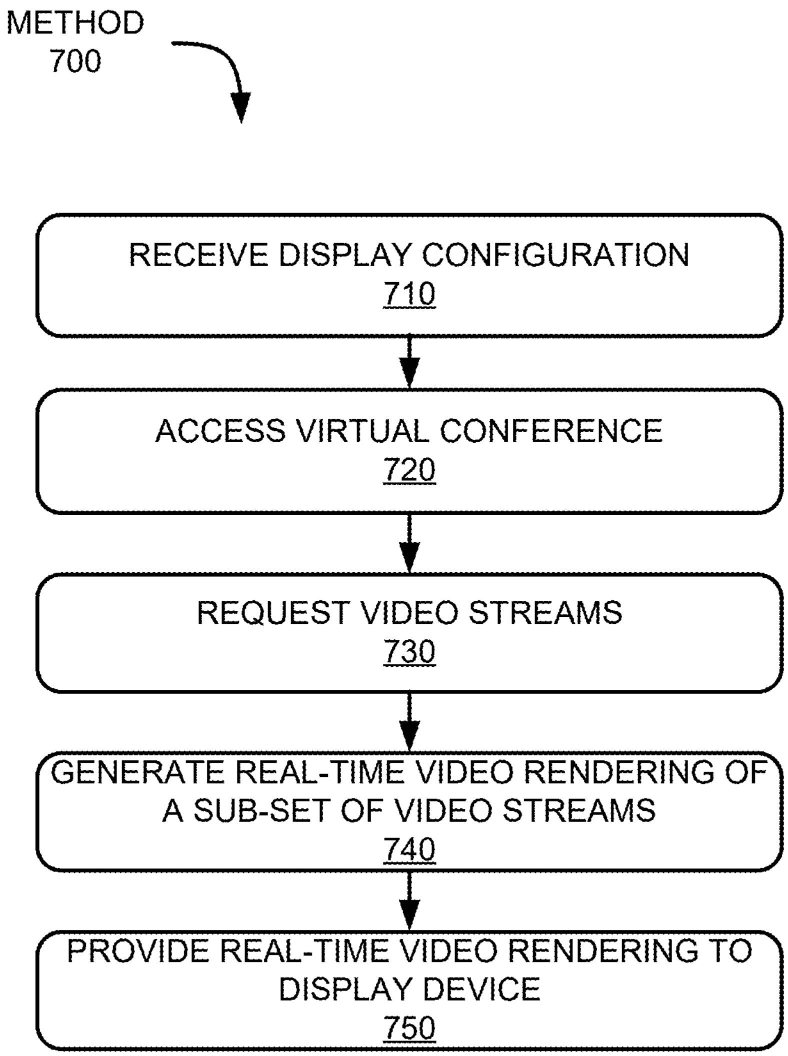
FIG. 7 shows an example method for distributing video streams to display screens during a hybrid conference.

Referring now to FIG. 7, FIG. 7 shows an example method 700 for distributing video streams to display screens during a hybrid conference. The method 600 will be discussed with respect to the systems 300, 400 shown in FIGS. 3 and 4; however, it should be appreciated that any suitable system according to this disclosure may be employed.

At block 710, the display management software 412 executed by the display management device 410 receives one or more display configuration selections for one or more corresponding video conference displays for a hybrid conference location. As discussed above, a hybrid conference location provides a real-world space 330 associated with a corresponding virtual conference hosted by a virtual conference provider 310. As discussed above with respect to FIGS. 4-5, a user may generate a display configuration for one or more displays to be used as a part of virtual conference. In this example, the conference is a hybrid conference, though such a configuration may be used during an entirely virtual conference instead.

At block 720, the display management software 412 accesses the virtual conference corresponding to the hybrid event. In this example, the display management software 412 employs the virtual conference ID and passcode included within the display configuration 418, generally as discussed above with respect to FIG. 5.

At block 730, the display management software 412 requests a plurality of video streams of the virtual conference from the virtual conference provider 310, generally as discussed above with respect to FIG. 4. After requesting the plurality of video streams, the display management software 412 may identify video streams to allocate to display devices. As discussed above, the display management software 412 may employ certain display configuration information, such as types of video streams to block, e.g., those with no video or from hosts/co-hosts of the conference, or it may employ a trained AI model to analyze individual video streams to identify those to include, favorite, or block, generally as described above with respect to FIG. 4. The display management software 412 may then allocate suitable video streams to the configured displays and transmit the identification of those video streams 416, or the video streams themselves, to the corresponding rendering nodes.

At block 740, the system 400 generates, for each video conference display of the one or more video conference displays, a real-time video rendering of a respective subset of the plurality of video streams according to the one or more display configurations. As discussed above with respect to FIGS. 4 and 6, the display management device or one or more rendering nodes may generate a real-time arrangement of a respective subset of the plurality of display streams. For example, as discussed with respect to FIG. 4, the display management device may identify one or more video streams 416 to a rendering node, which the rendering node may then use to generate rendered video 440 to transmit to a corresponding display device. Further, and as discussed above, the rendering node 420 may request and receive the individual video streams 430 themselves directly from the virtual conference provider 310 or may receive them via the display management device 410. It may then generate rendered video 440 according to the display configuration 418 for a particular display. If a rendering node 420 renders video for multiple display devices, it may receive display configurations 418 for each display device and render video 440 for each different display device according to the display configuration 418 for that display device.

At block 750, the system 700 provides the real-time video rendering to a respective display device, generally as discussed above with respect to FIGS. 4 and 6.

While the discussion of the example method 700 is in the context of a system employing a display management device and a rendering node, it should be appreciated that examples systems do not require any discrete rendering nodes. Instead, a single display management device 410 may be employed. However, in some examples, a display management device 410 may be used in conjunction with any number of rendering nodes, and may itself operate as one of those rendering nodes as well as providing display management software 412. Thus, the method 700 provides an example use of the system, but example systems provide flexible architectures to scale as needed for any number of display devices.

Figure 8:
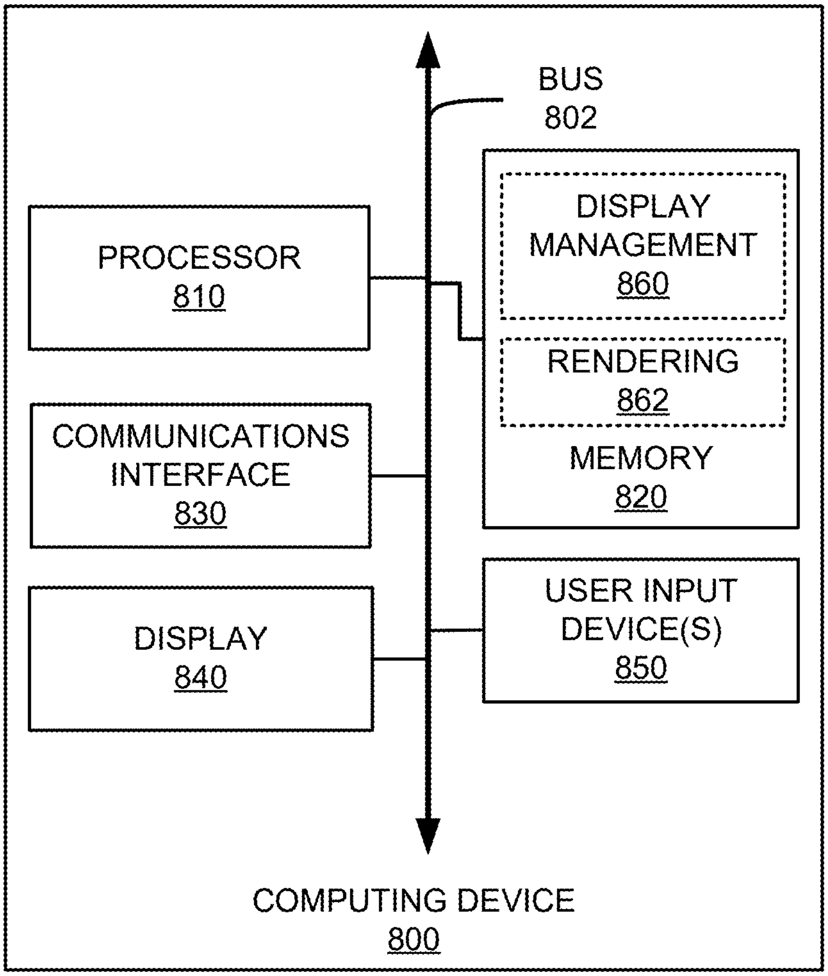
FIG. 8 shows an example computing device suitable for use with systems and methods for distributing video streams to display screens during a hybrid conference.

Referring now to FIG. 8, FIG. 8 shows an example computing device 800 suitable for use in example systems or methods for distributing video streams to display screens during a hybrid conference according to this disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for distributing video streams to display screens during a hybrid conference according to different examples, such as part or all of the example method 700 described above with respect to FIG. 7. Suitable example computing devices 800, such as user client devices, may also include one or more user input devices 850, such as a keyboard, mouse, touchscreen, microphone, etc., to accept user input. The computing device 800 also includes a display 840 to provide visual output to a user. In addition, the computing device 800 includes display management software 860 and rendering software 862, such as discussed above with respect to FIGS. 3-6.

The computing device 800 also includes a communications interface 840. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:

receiving, by a display management device, one or more display configuration selections for one or more corresponding video conference displays positioned in a hybrid conference location, the hybrid conference location providing a real-world space associated with a corresponding virtual conference hosted by a virtual conference provider;

accessing, by the display management device, the corresponding virtual conference via the virtual conference provider;

requesting, by the display management device, a plurality of video streams of the virtual conference from the virtual conference provider, each video stream corresponding to a virtual participant, the display management device not corresponding to any virtual participant;

generating, for each video conference display of the one or more video conference displays, a real-time video rendering of a respective subset of the plurality of video streams according to the one or more display configurations; and providing, to the one or more video conference displays, the respective real-time video rendering.

2. The method of claim 1, wherein requesting the plurality of video streams comprises:

determining a bandwidth limitation associated with a connection to the virtual conference;

identifying a lower-bandwidth version of one or more video streams of the plurality of video streams; and requesting the plurality of video streams and the lower-bandwidth version of the one or more video streams.

3. The method of claim 1, further comprising:

determining a selection of a second plurality of video streams of the virtual conference;

generating an up-next queue based on the second plurality of video streams; and after a predetermined elapsed time, replacing a first video stream of the subset of the plurality of video streams in the real-time video rendering with a second video stream from the up-next queue.

4. The method of claim 1, further comprising:

identifying one or more video streams from the plurality of video streams to exclude from the real-time video rendering; and wherein generating the real-time video rendering comprises excluding the identified one or more video streams from the subset of the plurality of video streams.

5. The method of claim 4, wherein identifying the one or more video streams comprises identifying a video stream having an undesirable characteristic, the undesirable characteristic comprising no detected face, an inattentive participant, a resolution below a predetermined threshold, or a connection quality below a predetermined network threshold.

6. The method of claim 1, wherein providing the subset of plurality of video streams according to the real-time video rendering, comprises:

establishing communications with one or more rendering nodes;

assigning to each rendering node a respective node subset of the subset of the plurality of video streams;

providing to each rendering node the real-time video rendering of the subset of the plurality of video streams; and instructing each rendering node to generate a respective real-time video rendering based on the respective node subset of the subset of the plurality of video streams to a respective video conference display of the one or more video conference displays.

7. The method of claim 1, wherein the one or more display configuration selections are received before the corresponding virtual conference begins.

8. The method of claim 1, further comprising:

receiving a selection of a video stream of the subset of the plurality of video streams;

receiving an input to block the video stream; and remove the video stream from the subset of the plurality of video streams.

9. The method of claim 1, further comprising:

receiving, during the corresponding video conference, a modification of one or more of the one or more display configuration selections;

updating the real-time video rendering based on the modification; and providing, to the one or more video conference displays, the subset of plurality of video streams according to the updated real-time video rendering.

10. The method of claim 1, further comprising selecting, using a trained AI model, the subset of the plurality of video streams.

11. A system comprising:

a non-transitory computer-readable medium comprising processor-executable instructions; and one or more processors communicatively coupled to the non-transitory computer-readable medium, the one or more processors configured to execute the processor-executable instructions stored in the non-transitory computer-readable medium to:

receive, by a display management device, one or more display configuration selections for one or more corresponding video conference displays positioned in a hybrid conference location, the hybrid conference location providing a real-world space associated with a corresponding virtual conference hosted by a virtual conference provider;

access, by the display management device, the corresponding virtual conference via the virtual conference provider;

request, by the display management device, a plurality of video streams of the virtual conference from the virtual conference provider, each video stream corresponding to a virtual participant, the display management device not corresponding to any virtual participant;

generate, for each video conference display of the one or more video conference displays, a real-time video rendering of a respective subset of the plurality of video streams according to the one or more display configurations; and provide, to the one or more video conference displays, the respective real-time video rendering.

12. The system of claim 11, wherein the one or more processors are configured to execute further processor-executable instructions stored in the non-transitory computer-readable medium to:

determine a bandwidth limitation associated with a connection to the virtual conference;

identify a lower-bandwidth version of one or more video streams of the plurality of video streams; and request the plurality of video streams and the lower-bandwidth version of the one or more video streams.

13. The system of claim 11, wherein the one or more processors are configured to execute further processor-executable instructions stored in the non-transitory computer-readable medium to:

determine a selection of a second plurality of video streams of the virtual conference;

generate an up-next queue based on the second plurality of video streams; and after a predetermined elapsed time, replace a first video stream of the subset of the plurality of video streams in the real-time video rendering with a second video stream from the up-next queue.

14. The system of claim 11, wherein the one or more processors are configured to execute further processor-executable instructions stored in the non-transitory computer-readable medium to:

identify one or more video streams from the plurality of video streams to exclude from the real-time video rendering; and exclude the identified one or more video streams from the subset of the plurality of video streams from the real-time video rendering.

15. The system of claim 14, wherein the one or more processors are configured to execute further processor-executable instructions stored in the non-transitory computer-readable medium to identify a video stream having an undesirable characteristic, the undesirable characteristic comprising no detected face, an inattentive participant, a resolution below a predetermined threshold, or a connection quality below a predetermined network threshold.

16. The system of claim 11, wherein the one or more processors are configured to execute further processor-executable instructions stored in the non-transitory computer-readable medium to:

receive a selection of a video stream of the subset of the plurality of video streams;

receive an input to block the video stream; and remove the video stream from the subset of the plurality of video streams.

17. The system of claim 11, wherein the one or more processors are configured to execute further processor-executable instructions stored in the non-transitory computer-readable medium to:

receive, during the corresponding video conference, a modification of one or more of the one or more display configuration selections;

update the real-time video rendering based on the modification; and provide, to the one or more video conference displays, the subset of plurality of video streams according to the updated real-time video rendering.

18. The system of claim 11, wherein the one or more processors are configured to execute further processor-executable instructions stored in the non-transitory computer-readable medium to select, using a trained AI model, the subset of the plurality of video streams.

19. A non-transitory computer-readable medium comprising processor-executable instructions configured to cause one or more processors to:

receive, by a display management device, one or more display configuration selections for one or more corresponding video conference displays positioned in a hybrid conference location, the hybrid conference location providing a real-world space associated with a corresponding virtual conference hosted by a virtual conference provider;

access, by the display management device, the corresponding virtual conference via the virtual conference provider;

request, by the display management device, a plurality of video streams of the virtual conference from the virtual conference provider, each video stream corresponding to a virtual participant, the display management device not corresponding to any virtual participant;

generate, for each video conference display of the one or more video conference displays, a real-time video rendering of a respective subset of the plurality of video streams according to the one or more display configurations; and provide, to the one or more video conference displays, the respective real-time video rendering.

20. The non-transitory computer-readable medium of claim 19, further comprising processor-executable instructions configured to cause the one or more processors:

determine a selection of a second plurality of video streams of the virtual conference;

generate an up-next queue based on the second plurality of video streams; and after a predetermined elapsed time, replace a first video stream of the subset of the plurality of video streams in the real-time video rendering with a second video stream from the up-next queue.

* * * * *